(12) United States Patent
Khatri et al.

(10) Patent No.: US 12,189,503 B2
(45) Date of Patent: Jan. 7, 2025

(54) AUTOMATIC FAILOVER OF A NON-RELATIONAL DATABASE

(71) Applicant: Capital One Services, LLC, McLean, VA (US)

(72) Inventors: Maqbool A Khatri, Glen Allen, VA (US); Guganathan Sellamuthu, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 10 days.

(21) Appl. No.: 17/985,987

(22) Filed: Nov. 14, 2022

(65) Prior Publication Data
US 2024/0160539 A1   May 16, 2024

(51) Int. Cl.
*G06F 11/00* (2006.01)
*G06F 11/20* (2006.01)

(52) U.S. Cl.
CPC ........ *G06F 11/2028* (2013.01); *G06F 11/008* (2013.01); *G06F 11/2025* (2013.01)

(58) Field of Classification Search
CPC . G06F 11/008; G06F 11/2025; G06F 11/2028
See application file for complete search history.

(56) References Cited

U.S. PATENT DOCUMENTS

| | | | |
|---|---|---|---|
| 8,572,031 B2 * | 10/2013 | Merriman | G06F 11/0709 707/613 |
| 11,010,233 B1 | 5/2021 | Golden et al. | |
| 11,757,703 B1 * | 9/2023 | Hotinger | H04L 41/0896 709/224 |
| 2020/0092404 A1 | 3/2020 | Wagmann et al. | |
| 2021/0382912 A1 | 12/2021 | Horowitz et al. | |
| 2022/0121510 A1 * | 4/2022 | Huang | G06F 11/2028 |
| 2022/0164334 A1 * | 5/2022 | Chen | G06F 16/256 |
| 2023/0071606 A1 * | 3/2023 | Kesavan | G06F 11/3409 |

OTHER PUBLICATIONS

Setiadi, Iskandar and Achmad Imam Kistijantoro, TippyDB: Geographically-Aware Distributed NoSQL Key-Value Store, 2015, IEEE (Year: 2015).*
Kirsten, Dirk, Efficient and failure-aware replication of an XML database, Sep. 2014, Universitat Konstanz (Year: 2014).*

* cited by examiner

*Primary Examiner* — Marc Duncan
(74) *Attorney, Agent, or Firm* — Foley & Lardner LLP (57) ABSTRACT

Disclosed embodiments pertain to automatic failover for non-relational databases. A machine learning model can be generated and trained with historical failover data. The historical failover data can be related to previous primary node failures or previous region failures of a plurality of non-relational databases. A non-relational database may be monitored for real-time or near-real-time data. The data can be input into the machine learning model to predict the likelihood that a primary region is in a failure state. A new primary node can be designated automatically when the likelihood satisfies a predetermined threshold. Data services are thus automatically transferred from a primary node in the failing region to a new primary node in a non-failing region.

17 Claims, 5 Drawing Sheets

AUTOMATIC FAILOVER OF A NON-RELATIONAL DATABASE

BACKGROUND

Database replication involves copying electronic data from one database to another. One or more applications can connect to and interact with a primary database. A database management system can perform a replication process that copies data and changes, additions, and deletions to secondary databases. Often the primary and secondary databases are at geographically different locations for improved availability and disaster tolerance. If the primary database experiences a failure or goes down, an automatic failover process can cause a secondary database to become the primary database to minimize downtime. Various factors can be considered in identifying a particular secondary database, including priority, uptime, last secondary database connected to the primary database, and proximity to the primary database. In one situation, these factors can be employed to filter candidates, and an election can be held in which other secondary databases or replicas can cast votes to elect a secondary database as the primary database.

SUMMARY

The following presents a simplified summary to provide a basic understanding of some aspects of the disclosed subject matter. This summary is not an extensive overview. It is not intended to identify necessary elements or to delineate the scope of the claimed subject matter. Rather, this summary presents some concepts in a simplified form as a prelude to the more detailed description presented later.

According to one aspect, disclosed embodiments can include an analytics-based form completion system that comprises a processor coupled to a memory that includes instructions that, when executed by the processor, cause the processor to monitor a health characteristic of a primary region of a non-relational database cluster that provides data services to an application, includes a plurality of geographically separate regions, and employs majority election of a primary in automatic failover, invoke a machine learning model on the health characteristic, in which the machine learning model is trained on historical failover data to predict a likelihood of a failover state of the primary region, and designate a second region of the plurality of geographically separate regions as the primary region to provide the data services to the application when the likelihood of the failover state satisfies a predetermined threshold. In one instance, the non-relational database cluster can comprise documents as a unit of data and include a non-relational database management system that performs automatic failover. Further, each region can comprise more than two databases, and automatic failover is performed to elect a new primary database when a primary database in a region fails. The instructions can further cause the processor to influence voting to ensure that the second region of the plurality of geographically separate regions is designated as the primary region. The instructions can specify a lambda function in one embodiment that designates the second region as the primary region. The lambda function can be called by an automated process invoked by a paging system in response to a predicted failover state. The health characteristic can comprise failure data, network data, power consumption data, traffic data, or an error state. The instructions can further cause the process to update the machine learning model with new health characteristics.

In accordance with another aspect, disclosed embodiments can include a method comprising executing, on a processor, instructions that cause the processor to perform operations associated with automatic failover. The operations include monitoring failover data of a primary region of a non-relational database that provides data services to an application, consists of two regions, and employs majority election of a primary in automatic failover. Further, the operations can comprise invoking a machine learning model on the failover data, wherein the machine learning model is trained with historical failover data to predict a likelihood of a failover state of the primary region, and appointing a second region of the two regions as the primary region to provide the data services to the application when the likelihood of the failover state satisfies a predetermined threshold. The operations can further comprise monitoring the failover data of the primary region of a distributed non-relational database that stores data in documents. The operations can also comprise performing the automatic failover for database replicas within the primary region by a non-relational database management system. In addition, the operations can comprise changing votes to elect the second region as the primary region. Further, the operations can comprise monitoring at least one of failure data, network data, power consumption data, traffic data, or an error state as the failover data. Furthermore, the operations can comprise retraining the machine learning model with new failover data associated with a plurality of non-relational databases to update the machine learning model.

According to yet another aspect, disclosed embodiments can include a computer-implemented method. The method can comprise receiving historical failover data for a plurality of non-relational databases and training a machine learning model with the historical failover data to predict a failover state of a primary node of a non-relational database. The method can also comprise monitoring current failover data of a primary region of a non-relational database that consists of two geographically separate regions and employs majority election of a primary in automatic failover, executing the machine learning model with the current failover data to produce a likelihood that the primary region is in a failure state, and causing a second region of the two geographically separate regions to be selected as the primary region when the likelihood satisfies a predetermined threshold value. The computer-implemented method can also comprise changing votes to cause the second region to be elected as the primary region, electing one of more than two database replicas in the second region as a primary database replica, and training the machine learning model with at least one of failure data, network data, power consumption data, traffic data, or error state.

To accomplish the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

Aspects of the disclosure are understood from the following detailed description when read with the accompanying drawings. It will be appreciated that the elements

DETAILED DESCRIPTION

Databases can replicate data across regions in a primary and secondary hierarchy. A primary node can be selected based on a voting process of nodes across multiple regions in some implementations (e.g., MongoDB). The voting structure typically employs an odd number of replica set regions such that a primary node can be selected with a majority of votes. Nevertheless, such a voting system breaks down with a set of two regions, such as a primary region and one secondary region. If the primary fails, there are not enough votes to elect a new primary node. Manual intervention of a network technician is required to perform a failover to the secondary node or region. However, manual intervention is undesirable and antithetical to autonomous database systems and automatic failover.

Aspects and embodiments disclosed herein provide a technical solution to the aforementioned technical problem. Further, the aspects and embodiments provide substantial benefits regarding automatic failover for distributed databases. One advantage, for example, resides in a predictive intervention of failing regions. Another advantage resides in a streamlined failover from a failed region to an online region that automatically elects a new primary.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
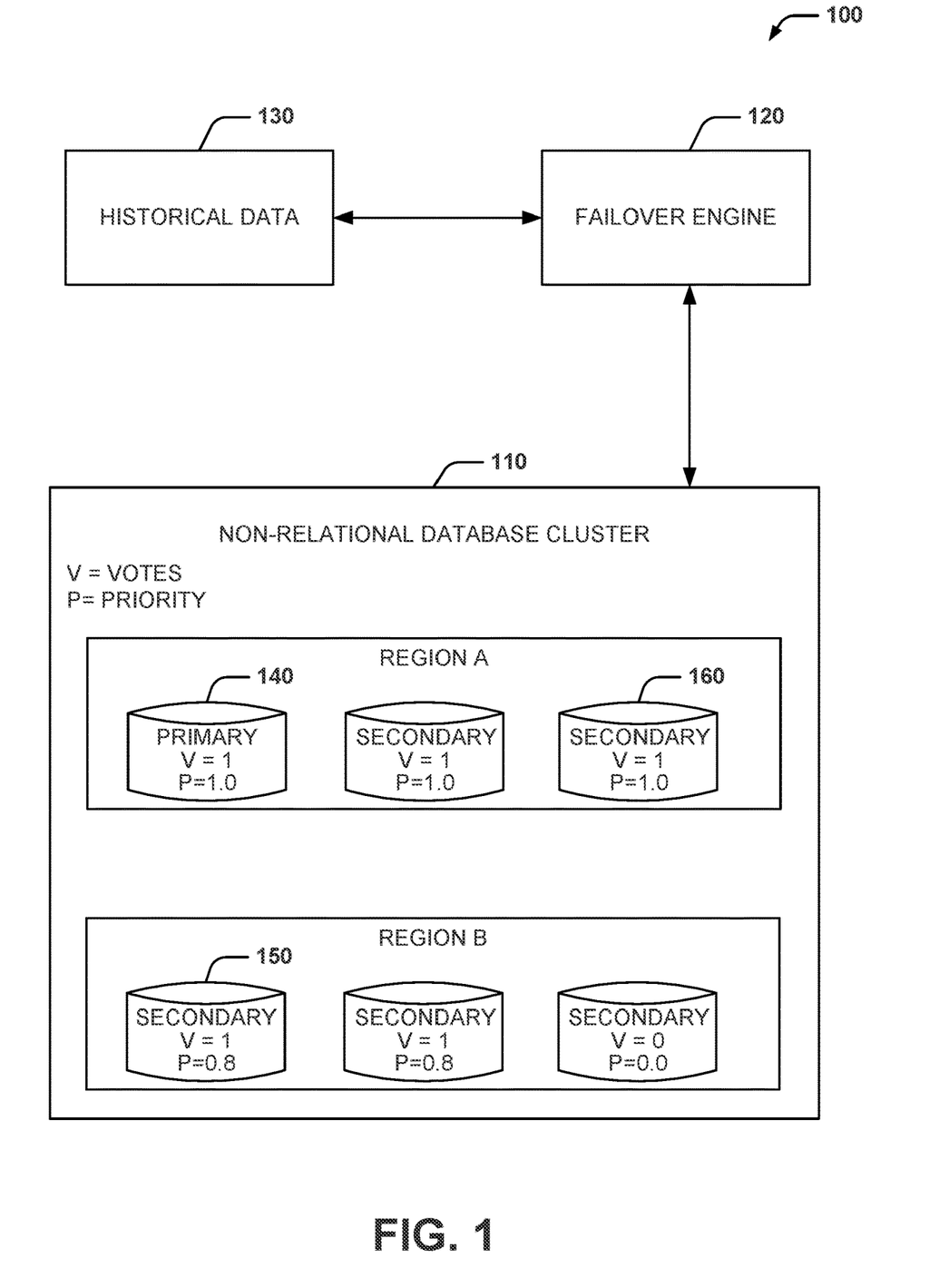
FIG. 1 illustrates a high-level diagram of aspects of the subject disclosure.

Referring initially to FIG. 1, a high-level view of an example implementation 100 is depicted. A non-relational database 110 or non-relational database cluster 110 can include a primary node in a region A for storing data and secondary nodes or replica nodes in region A and region B. In some embodiments, region A and region B are two different regions or two separate geographical regions. The replica nodes or secondary nodes may mirror the primary node in region A for redundancy or backup of the data in the primary node. In some embodiments, the non-relational database 110 may be a NoSQL database, non-SQL database, not only SQL database, a MongoDB™, or the like. The non-relational database 110 includes the primary node and replica nodes across multiple regions (region A and region B) for data replication and redundancy in case of a failover, failover state, fail state, or the like.

A failover engine 120 can monitor the non-relational database 110 for data indicative of a failover occurrence or failover state. For example, the failover engine 120 can monitor the non-relational database 110 for network data, power consumption data, or the like. In some embodiments, the failover engine 120 can predict a failover is occurring or that is imminent to occur at a primary node or across a region (e.g., all nodes in region A) of the primary node or a two region failure of the non-relational database 110.

The failover engine 120 may predict the failover with a failover model. The failover engine 120 may receive historical failover data 130 or, in other words, health characteristics. In some embodiments, the failover engine 120 may receive the historical failover data 130 from a plurality of non-relational databases. For example, the plurality of non-relational databases can be other implementations of the same type of database, implementations across the same regions, implementations of a store of the same type of data, or the like. The historical failover data 130 may include node failure data, network data, power consumption data, traffic data, access data, read/write errors, other error states, hacking data, attack data, or the like associated with the plurality of non-relational databases before or after a previous failover. In some embodiments, the failover engine 120 can provide and train a machine-learning failover model with the historical data 130. The failover engine 120 generates the failover model trained to determine correlations within the failover data and an affirmed failover state of a non-relational database, a region(s) of a non-relational database, a primary node, or the like.

In some embodiments, the failover engine 120 may monitor the non-relational database 110. The non-relational database 110 includes a primary node 140 that can reside in a region A. A replica node 150, or secondary of the primary node 140, can reside within region B and be located in a different geographic location than region A. Other replica nodes, such as secondary node 160, can reside in region A with the primary node 140. The non-relational database 110 can be deployed using two regions (e.g., region A and region B). The primary node 140 can reside in a first region, region A, and the replica 150 resides in a second region, region B, in this example. In some embodiments, the non-relational database 110 is a NoSQL database or a MongoDB database.

The failover engine 120 may collect real-time or near real-time failover data or health characteristics of the non-relational database 110. The failover engine 120 may analyze the near real-time failover data or present data conditions to determine whether the non-relational database 110 is in a failover state or if a failover state is imminent. The failover engine 120 may analyze the near real-time failover data via the failover model. The failover model can determine a likelihood that nodes in region A of the non-relational database 110 are in a failover state or if a failover state is imminent. The failover engine 120 can compare the likelihood to a threshold likelihood. The failover engine 120 can transfer the data services to the replica 150 in region B based on the failover likelihood exceeding the threshold likelihood.

The failover engine 120 may transfer data services of the primary node 140 in region A to a replica 150 in region B based on the failover model output. The failover model output may predict that a failover state of region A is about to occur or is occurring. The failover engine 120 transfers the data services from the primary node 140 to the replica 150 in the separate region (e.g., from the primary node in region A to the replica in region B). In some embodiments, the failover engine 120 may influence or change votes for each node such that a new primary node is elected that resides in a different region than the failing region (e.g., from primary node 140 in region A to a replica 150 in region B).

In some embodiments, the failover engine 120 may update the failover model with new failover data over time. The failover engine 120 may provide monitored data conditions to the machine learning algorithm to refine or update the failover model according to further failovers of the plurality of non-relational databases or the non-relational database 110.

More particularly, the non-relational database 110 can include automatic failover functionality. Within region A, for example, if the primary database 140 goes down, a new primary database within region A can be elected based on a majority vote. However, if the entirety of region A goes down, for example, due to a local fire, flood, or other natural disasters, automatic failover can fail in a majority-vote-based system. In essence, the non-relational database 110 includes two replicas, region A and region B. If region A goes down, there are not enough votes to elect region B as the new primary, and typically manual intervention is required. Here, however, the failover engine 120 can detect or predict such a failure and intervene to set region B as the primary region when region A goes down. Since there is an odd number of replicas in region B, automatic failover can be employed to elect one as the primary database that enables changes (e.g., addition, deletion, update) as well as read operations.

Figure 2:
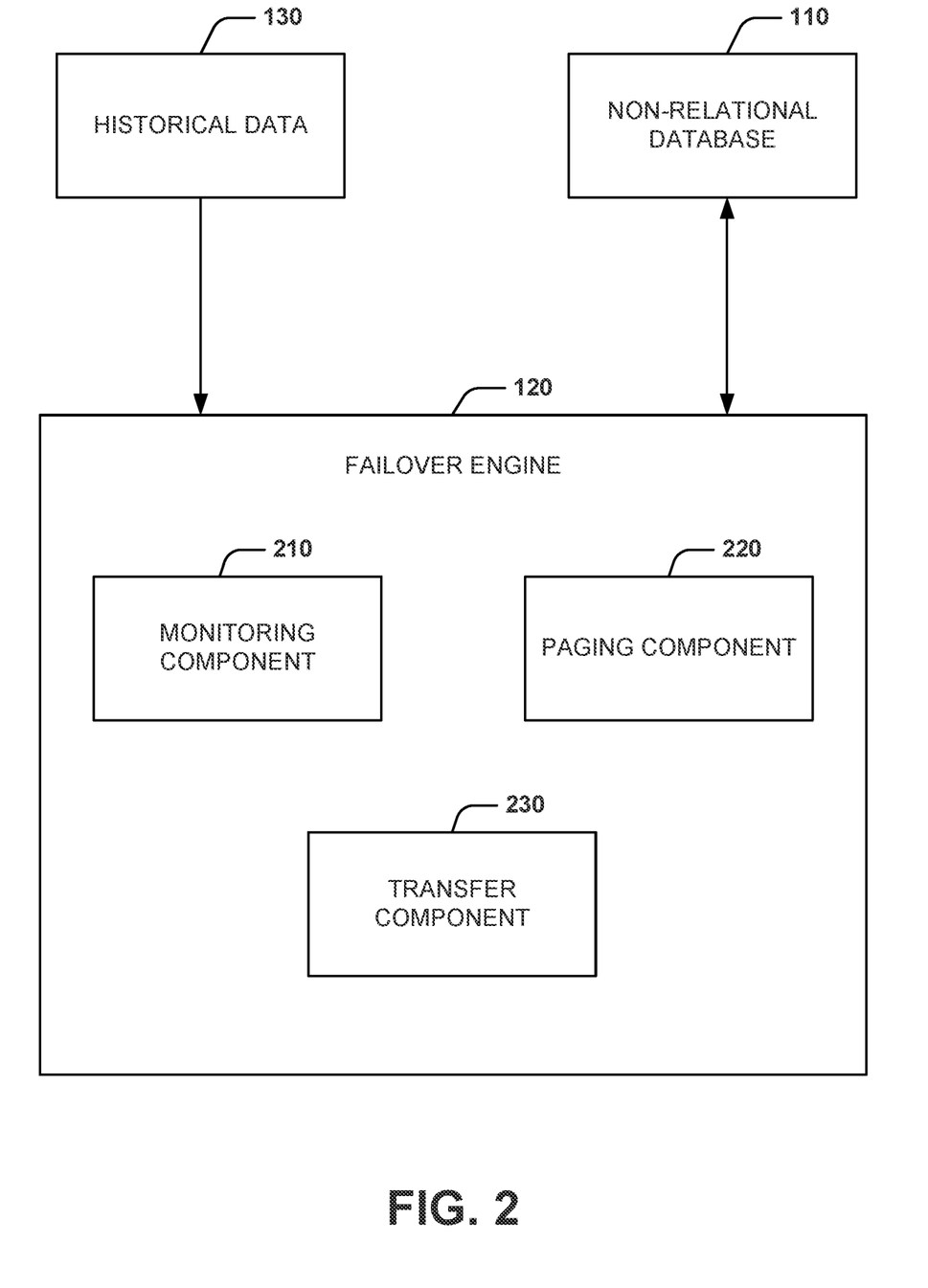
FIG. 2 illustrates an example component diagram of a failover engine.

FIG. 2 illustrates a detailed component diagram of the failover engine 120. The failover engine 120 includes a monitoring component 210. The monitoring component 210 can be implemented in hardware, software, or a combination of hardware and software. The monitoring component 210 can monitor the non-relational database 110 for data indicative of a failover occurrence or failover state. For example, the monitoring component 210 may monitor the non-relational database 110 for network data, power consumption data, regional outages, attack data, or the like. The monitoring component 210 may monitor or compile other data factors in some embodiments. For example, the other data factors may include weather factors, regional outages, outside database outages, news report data, social media data, or the like.

The failover engine 120 can include a paging component 220. The paging component 220 may predict a failover that is imminent to occur at a primary node of the non-relational database 110. The paging component 220 can predict the failover by way of a failover model. The paging component 220 can receive historical failover data 130. In some embodiments, the paging component 220 can receive the historical failover data 130 from a plurality of non-relational databases. For example, the plurality of non-relational databases can be other implementations of the same type of database, implementations across the same regions, implementations of the same type of data, or the like. The historical failover data 130 may include network data, power consumption data, traffic data, access data, read/write errors, other error states, hacking data, attack data, or the like associated with the plurality of non-relational databases before or after a previous failover. In some embodiments, the paging component 220 can be trained with historical failover data to correlate failover data with affirmed failover states of a non-relational database.

In some embodiments, the paging component 220 can receive present data from monitoring component 210 associated with the non-relational database 110. The non-relational database 110 or present non-relational database 110 includes a primary node that may reside in a region A. A replica node or replica of the primary node may reside within region A and in a different region B. The non-relational database 110 can be deployed using two regions (e.g., region A and region B). The primary node may reside in a first region, region A, and the replica resides in a second region, region B. In some embodiments, the non-relational database 110 is a NoSQL database or a MongoDB database.

The monitoring component 210 can collect real-time or near real-time failover data of the non-relational database 110. The paging component 220 can analyze the near real-time failover data to determine whether the non-relational database 110 is in a failover state or if a failover state is imminent. The paging component 220 can analyze the near real-time failover data by invoking and executing the failover model. The failover model can determine a likelihood that the non-relational database 110 is in a failover state or if a failover state is imminent based on present data conditions received from the monitoring component 210. In some embodiments, the paging component 220 may compare the likelihood to a threshold likelihood.

In some embodiments, paging component 220 determines failover rules. The paging component 220 can determine, through the failover model, failover rules for the non-relational database 110. The failover rules enumerate conditions related to the non-relational database for transferring data services from the primary node to the replica. For example, a condition can be when read and write requests of the primary node exceed a threshold that is indicative of an attack.

The failover engine 120 can include a transfer component 230. The transfer component 230 can automatically transfer the data services to a replica based on the failover likelihood exceeding the threshold likelihood. The transfer component 230 can transfer data services of the primary node to a replica based on the failover model output. The failover model output can predict that a failover state is about to occur or is occurring. The transfer component 230 transfers the data services from the primary node to the replica in a separate region (e.g., from the primary node in region A to the replica in region B).

In some embodiments, the transfer component 230 can call a function (e.g., a lambda function) to transfer data services to the replica. In some embodiments, the lambda function is an outside script that externally influences primary voting and priority weighting of nodes such that a different node in the non-relational database 110 is elected. For example, the lambda function flips votes that elected the primary node 140 in region A to the replica 150 in region B such that the primary node 140 ceases to provide read and write access, and the replica 150 takes over read and write access functionality. The replica 150 converts into a new primary node in region B (e.g., a non-failing region) of the non-relational database 110.

Figure 3:
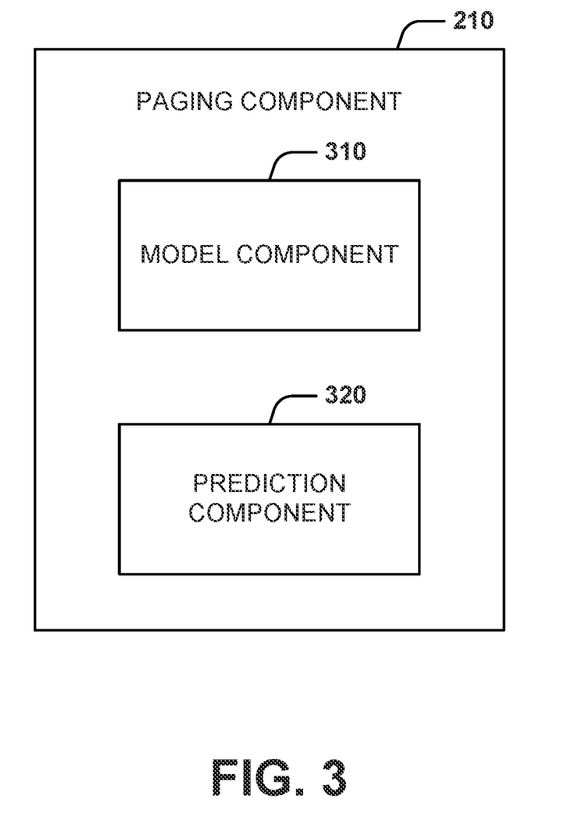
FIG. 3 illustrates an example component diagram of a paging component.

FIG. 3 illustrates a detailed component diagram of the paging component 220. The paging component 220 can include a model component 310. The model component 310 may receive historical failover data 130. In some embodiments, the model component 310 may receive the historical failover data 130 from a plurality of non-relational databases. For example, the plurality of non-relational databases can be other implementations of the same type of database, implementations across the same regions, implementations of the same type of data, or the like. The historical failover data 130 may include network data, power consumption data, traffic data, access data, read/write errors, other error states, hacking data, attack data, or the like associated with the plurality of non-relational databases before or after a previous failover. In some embodiments, the model component 310 can be trained with historical failover data 130. The model component 310 can determine correlations within the failover data and an affirmed failover state of a non-relational database.

In some embodiments, the model component 310 determines a failover model based on analysis of historical failover data 130. The model component 310 can train the failover model with the historical failover data 130 of various metrics associated with the plurality of non-relational databases. For example, the model component 310 can be trained and employed to determine trends between network data, power consumption data, traffic data, access data, read/write errors, other error states, hacking data, attack data, or the like associated with a confirmed previous failover of a non-relational database of the plurality of non-relational databases. The model component 310 learns from existing data to make predictions about a current non-relational database (e.g., the non-relational database 110). The model component 310 builds the failover model from the historical failover data 130 (e.g., "training data set") to make data-driven predictions or decisions expressed as outputs or assessments of the non-relational database 110. The model component 310 can determine the trends or correlations within the historical failover data 130. For example, a number of captured increases or decreases in power consumption at a data center where a primary node resides before a failover state occurs at the primary node can be determined by the machine learning technique and utilized to build the failover model. The failover model can be provided inputs from the monitoring component 210 (e.g., power consumption data) and determine or output a likelihood of a failover state at the primary node 140.

The paging component 220 can also include a prediction component 320. The prediction component 320 applies the failover model to a current or upcoming set of data related to the non-relational database 110 to determine a likelihood of failover based on the trends revealed by the machine learning and the set of data. The prediction component 320 via the failover model can determine an output as the likelihood or a recommendation for a failover that includes a transfer of data services from the primary node to a replica in a different region (e.g., from the primary node 140 in region A to a replica or secondary node in region B).

Figure 4:
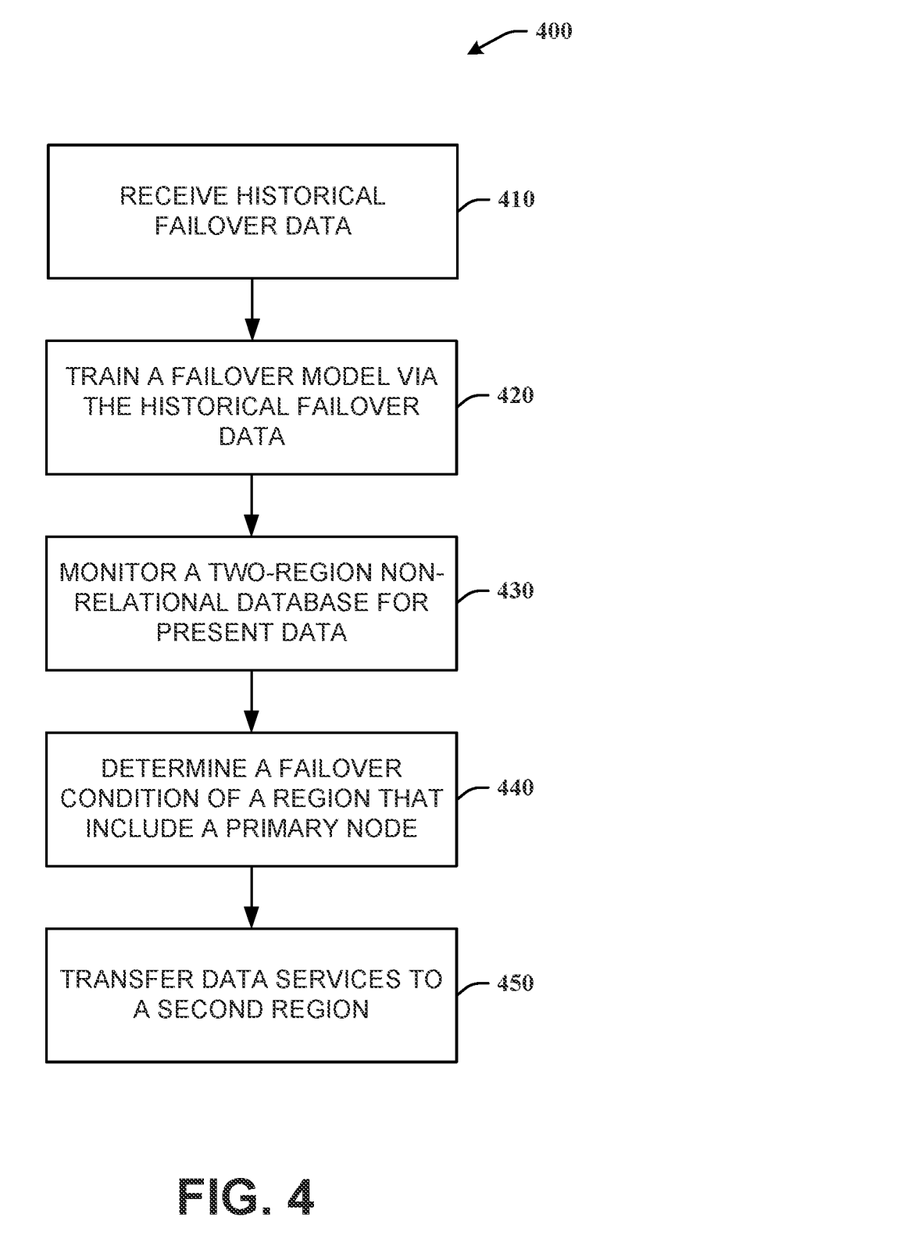
FIG. 4 illustrates an example method of automatic failover of a non-relational database.

With reference to FIG. 4, example method 400 depicts automatic failover of a non-relational database. While, for purposes of simplicity of explanation, the method is shown and described as a series of blocks, it is to be understood and appreciated that the disclosed subject matter is not limited by the order of the blocks, as some blocks may occur in different orders or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block. Alternatively, the method can be represented as a series of interrelated states or events, such as in a state diagram.

FIG. 4 illustrates a method 400 for automatic failover of a non-relational database. In one instance, the functionality of the method 400 can be implemented by the failover engine 120 or portions thereof.

At 410, the method receives historical failover data. The historical failover data can correspond (or refer) to a plurality of non-relational databases. For example, the plurality of non-relational databases can be other implementations of the same type of database, implementations across the same regions, implementations of a store of the same type of data, or the like. Among other things, the failover data 130 can include node failure data, network data, power consumption data, traffic data, access data, read/write errors, other error states, hacking data, attack data, or the like associated with the plurality of non-relational databases before or after a previous failover.

At 420, the method generates and trains a failover model with the historical failover data. The failover model can comprise a machine learning model trained to automatically predict a failover state of a primary node of a non-relational database. In one particular instance, the failover model can predict a failover state associated with two replicas or regions in which automatic failover fails for lack of votes.

At 430, the method monitors a non-relational database. The method can monitor states or ingest data regarding regions of the non-relational database and nodes in the region. In one instance, the monitoring can comprise invoking the failover model to predict the likelihood of a failover state or event, such as one or two regions going down.

At 440, the method can determine that a first region of the non-relational database is in a failover state. The failover model can output a likelihood of a region failure based on current data. The likelihood can be compared with a predetermined threshold, and if the likelihood satisfies the predetermined threshold, failover can be triggered or otherwise initiated.

At 440, the method can transfer data services from the first region to a second region. The method can transfer data services from a primary node of the first region of the non-relational database to a replica in a second region based on the failover state of the first region. In other words, the second region can be designated as the primary region. In some embodiments, the failover engine 120 may transfer the data services by changing vote to elect a new primary node that resides in the second region (e.g., a non-failing region) of the non-relational database.

As used herein, the terms "component" and "system," as well as various forms thereof (e.g., components, systems, sub-systems) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process or thread of execution, and a component may be localized on one computer or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having," or variations in form thereof are used in either the detailed description or the claims, such terms are intended to be inclusive in a manner similar to the term "comprising" as "comprising" is interpreted when employed as a transitional word in a claim.

Figure 5:
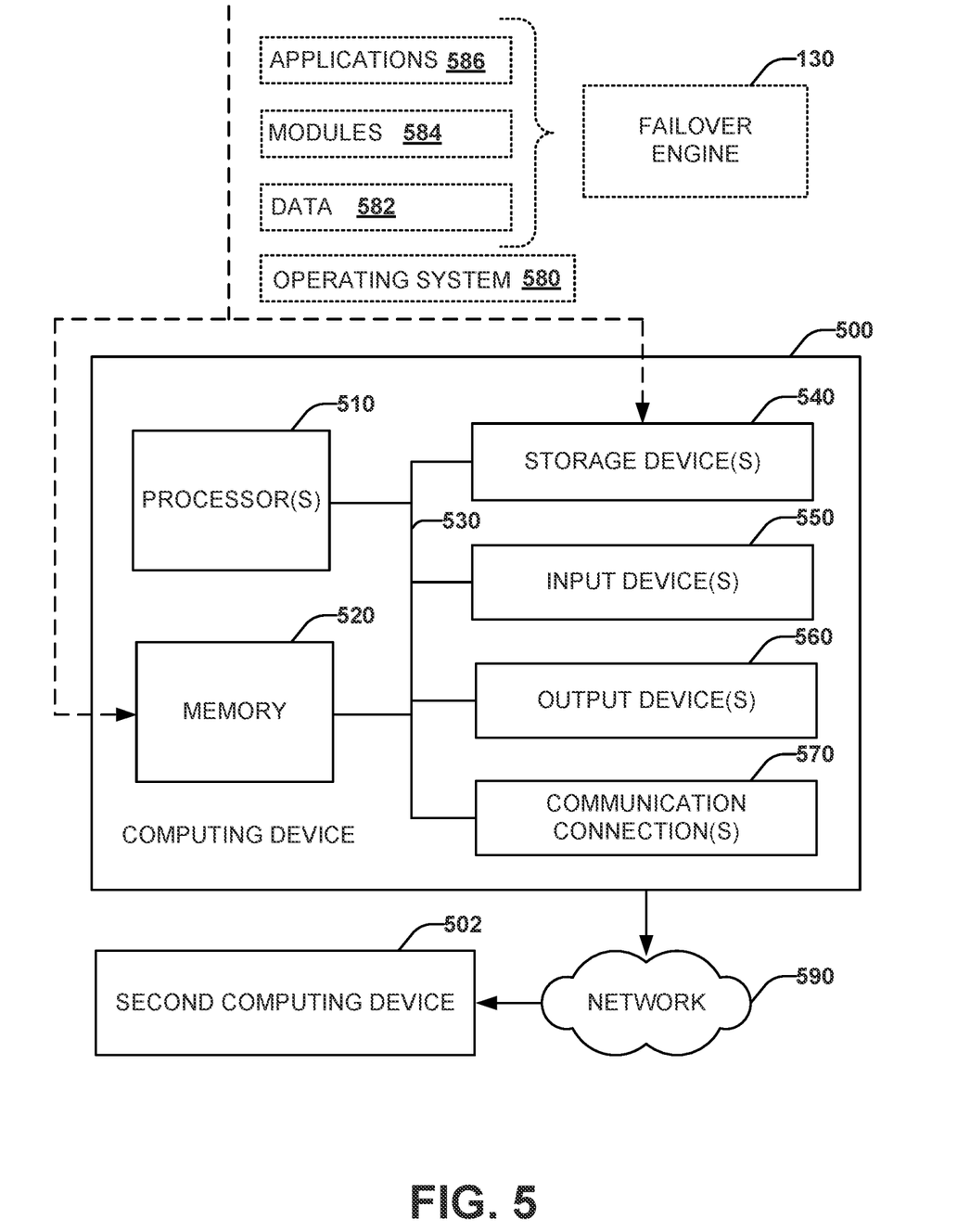
FIG. 5 illustrates a computing environment where one or more of the provisions set forth herein can be implemented according to some embodiments.

To provide a context for the disclosed subject matter, FIG. 5, as well as the following discussion, are intended to provide a brief, general description of a suitable environment in which various aspects of the disclosed subject matter can be implemented. The suitable environment, however, is solely an example and is not intended to suggest any limitation as to scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 5, illustrated is an example computing device 500 (e.g., desktop, laptop, tablet, watch, server, hand-held, programmable consumer or industrial electronics, set-top box, game system, compute node . . . ). The computing device 500 includes one or more processor(s) 510, memory 520, system bus 530, storage device(s) 540, input device(s) 550, output device(s) 560, and communications connection(s) 570. The system bus 530 communicatively couples at least the above system constituents. However, the computing device 500, in its simplest form, can include one or more processors 510 coupled to memory 520, wherein the one or more processors 510 execute various computer executable actions, instructions, and or components stored in the memory 520.

The processor(s) 510 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 510 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 510 can be a graphics processor unit (GPU) that performs calculations with respect to digital image processing and computer graphics.

The computing device 500 can include or otherwise interact with a variety of computer-readable media to facilitate control of the computing device to implement one or more aspects of the disclosed subject matter. The computer-readable media can be any available media accessible to the computing device 500 and includes volatile and non-volatile media, and removable and non-removable media. Computer-readable media can comprise two distinct and mutually exclusive types, namely storage media and communication media.

Storage media includes volatile and non-volatile, removable, and non-removable media implemented in any method or technology for storing information, such as computer-readable instructions, data structures, program modules, or other data. Storage media includes storage devices such as memory devices (e.g., random access memory (RAM), read-only memory (ROM), electrically erasable programmable read-only memory (EEPROM), magnetic storage devices (e.g., hard disk, floppy disk, cassettes, tape, optical disks (e.g., compact disk (CD), digital versatile disk (DVD), and solid state devices (e.g., solid state drive (SSD), flash memory drive (e.g., card, stick, key drive)), or any other like mediums that store, as opposed to transmit or communicate, the desired information accessible by the computing device 500. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 520 and storage device(s) 540 are examples of computer-readable storage media. Depending on the configuration and type of computing device, the memory 520 may be volatile (e.g., random access memory (RAM)), non-volatile (e.g., read only memory (ROM), flash memory), or some combination of the two. By way of example, the basic input/output system (BIOS), including basic routines to transfer information between elements within the computing device 500, such as during start-up, can be stored in non-volatile memory, while volatile memory can act as external cache memory to facilitate processing by the processor(s) 510, among other things.

The storage device(s) 540 include removable/non-removable, volatile/non-volatile storage media for storage of vast amounts of data relative to the memory 520. For example, storage device(s) 540 include, but are not limited to, one or more devices such as a magnetic or optical disk drive, floppy disk drive, flash memory, solid-state drive, or memory stick.

Memory 520 and storage device(s) 540 can include or have stored therein, operating system 580, one or more applications 586, one or more program modules 584, and data 582. The operating system 580 controls and allocates resources of the computing device 500. Applications 586 include one or both of system and application software and can exploit management of resources by the operating system 580 through program modules 584 and data 582 stored in the memory 520 or storage device(s) 540 to perform one or more actions. Accordingly, applications 586 can turn a general-purpose computer 500 into a specialized machine according to the logic provided.

All or portions of the disclosed subject matter can be implemented using standard programming or engineering techniques to produce software, firmware, hardware, or any combination thereof to control the computing device 500 to realize the disclosed functionality. By way of example and not limitation, all or portions of the failover engine 120 can be, or form part of, the application 586, and include one or more modules 584 and data 582 stored in memory and/or storage device(s) 540 whose functionality can be realized when executed by one or more processor(s) 510.

In accordance with one particular embodiment, the processor(s) 510 can correspond to a system on a chip (SOC) or like architecture including, or in other words integrating, both hardware and software on a single integrated circuit substrate. Here, the processor(s) 510 can include one or more processors as well as memory at least similar to the processor(s) 510 and memory 520, among other things. Conventional processors include a minimal amount of hardware and software and rely extensively on external hardware and software. By contrast, an SOC implementation of processor(s) 510 may be more powerful, as such an implementation may embed hardware and software that enable particular functionality with minimal or no reliance on external hardware and software. For example, the failover engine 120 or functionality associated therewith can be embedded within hardware in a SOC architecture.

The input device(s) 550 and output device(s) 560 can be communicatively coupled to the computing device 500. By way of example, the input device(s) 550 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 560, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 550 and output device(s) 560 can be connected to the computing device 500 by way of a wired connection (e.g., bus), wireless connection (e.g., Wi-Fi, Bluetooth), or a combination thereof.

The computing device 500 can also include communication connection(s) 570 to enable communication with at least a second computing device 502 by means of a network 590. The communication connection(s) 570 can include wired or wireless communication mechanisms to support network communication. The network 590 can correspond to a local area network (LAN) or a wide area network (WAN) such as the Internet. The second computing device 502 can be another processor-based device with which the computing device 500 can interact. For example, the computing device 500 can correspond to a server that executes functionality of the failover engine 120, and the second computing device 502 can be a user device that communicates and interacts with the computing device 500.

What has been described above includes examples of aspects of the claimed subject matter. Of course, it is impossible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
one or more processors and memory that includes instructions that, when executed by the one or more processors, cause the one or more processors to:
monitor a health characteristic of a first region designated as a primary region of a non-relational database cluster that provides data services to an application, wherein the non-relational database cluster includes a plurality of geographically separate regions and employs majority election of a primary in automatic failover;
invoke a machine learning model on the health characteristic, wherein the machine learning model is trained on historical failover data to predict a likelihood of a failover state of the primary region; and
designate a second region of the plurality of geographically separate regions as the primary region to provide the data services to the application when the likelihood of the failover state satisfies a predetermined threshold, wherein the instructions specify a lambda function that designates the second region as the primary region.

2. The system of claim 1, wherein the non-relational database cluster includes a non-relational database management system that performs the automatic failover.

3. The system of claim 1, wherein the non-relational database cluster comprises documents as a unit of data.

4. The system of claim 1, wherein each region of the plurality of geographically separate regions comprises more than two databases.

5. The system of claim 4, wherein the automatic failover is performed to elect a new primary database when a primary database in a region fails.

6. The system of claim 1 wherein the instructions further cause the one or more processors to influence voting to ensure the second region is designated as the primary region.

7. The system of claim 1, wherein the lambda function is called by an automated process that is invoked by a paging system in response to a predicted failover state.

8. The system of claim 1, wherein the health characteristic comprises one of failure data, network data, power consumption data, traffic data, or an error state.

9. The system of claim 1, wherein the instructions further cause the one or more processors to update the machine learning model based on the health characteristic.

10. A method, comprising:
executing, on one or more processors, instructions that cause the one or more processors to perform operations associated with automatic failover, the operations comprising:
monitoring failover data of first region designated as a primary region of a non-relational database cluster that provides data services to an application, includes at least two regions, and employs majority election of a primary in automatic failover;
invoking a machine learning model on the failover data, wherein the machine learning model is trained with historical failover data to predict a likelihood of a failover state of the primary region;
appointing a second region of the at least two regions as the primary region to provide the data services to the application when the likelihood of the failover state satisfies a predetermined threshold; and changing votes to elect the second region as the primary region.

11. The method of claim 10, wherein the operations further comprise monitoring the failover data of the primary region of a distributed non-relational database that stores data in documents.

12. The method of claim 11, wherein the operations further comprise performing the automatic failover for database replicas within the primary region by a non-relational database management system.

13. The method of claim 10, wherein the operations further comprise monitoring at least one of failure data, network data, power consumption data, traffic data, or an error state as the failover data.

14. The method of claim 10, wherein the operations further comprise retraining the machine learning model with new failover data associated with a plurality of non-relational databases to update the machine learning model.

15. One or more non-transitory computer-readable media storing instructions that when executed by one or more processors, cause operations comprising:
   receiving historical failover data for a plurality of non-relational databases;
   training a machine learning model with the historical failover data to predict a failover state of a primary node of a non-relational database cluster;
   monitoring current failover data of a first region designated as a primary region of a non-relational database cluster that includes two geographically separate regions and employs majority election of a primary in automatic failover;
   executing the machine learning model with the current failover data to produce a likelihood that the primary region is in a failure state;
   causing a second region of the two geographically separate regions to be selected as the primary region when the likelihood satisfies a predetermined threshold value; and
   changing votes to cause the second region to be elected as the primary region.

16. The one or more non-transitory computer-readable media of claim 15, the operations further comprising:
   electing one of more than two database replicas in the second region as a primary database replica.

17. The one or more non-transitory computer-readable media of claim 15, the operations further comprising:
   training the machine learning model with at least one of failure data, network data, power consumption data, traffic data, or error state.

* * * * *